US011532334B2

(12) United States Patent
Ross et al.

(10) Patent No.: US 11,532,334 B2
(45) Date of Patent: Dec. 20, 2022

(54) FORENSIC VIDEO RECORDING WITH PRESENCE DETECTION

(71) Applicant: Digital Ally, Inc., Lenexa, KS (US)

(72) Inventors: Stanton E. Ross, Overland Park, KS (US); Peng Han, Overland Park, KS (US); Jeremy A. Dick, Olathe, KS (US)

(73) Assignee: Digital Ally, Inc., Lenexa, KS (US)

( * ) Notice: Subject to any disclaimer, the term of this patent is extended or adjusted under 35 U.S.C. 154(b) by 0 days.

(21) Appl. No.: 17/213,919

(22) Filed: Mar. 26, 2021

(65) Prior Publication Data

US 2021/0217445 A1   Jul. 15, 2021

Related U.S. Application Data

(63) Continuation of application No. 14/880,453, filed on Oct. 12, 2015, now Pat. No. 10,964,351, which is a
(Continued)

(51) Int. Cl.
| | |
|---|---|
| *G11B 27/11* | (2006.01) |
| *G06K 19/07* | (2006.01) |
| *G06T 1/00* | (2006.01) |
| *G06V 20/80* | (2022.01) |
| *G11B 15/02* | (2006.01) |
| *G11B 27/10* | (2006.01) |
| *G11B 31/00* | (2006.01) |
| *H04H 20/00* | (2009.01) |
| *H04N 5/76* | (2006.01) |

(Continued)

(52) U.S. Cl.
CPC .......... *G11B 27/11* (2013.01); *G06K 19/0723* (2013.01); *G06T 1/0028* (2013.01); *G06V 20/80* (2022.01); *G11B 15/026* (2013.01); *G11B 27/10* (2013.01); *G11B 31/006* (2013.01); *H04H 20/00* (2013.01); *H04N 5/76* (2013.01); *H04N 5/772* (2013.01); *H04N 7/181* (2013.01); *H04N 7/188* (2013.01); *G08B 13/19671* (2013.01); *G08B 13/19695* (2013.01); *H04N 5/765* (2013.01)

(58) Field of Classification Search
USPC .................................. 386/223–224, 239–248
See application file for complete search history.

(56) References Cited

U.S. PATENT DOCUMENTS

| 2004/0131184 A1* | 7/2004 | Wu ..................... H04N 21/8358 380/202 |
| 2009/0189981 A1* | 7/2009 | Siann ..................... H04N 7/183 348/143 |

(Continued)

*Primary Examiner* — Hung Q Dang
(74) *Attorney, Agent, or Firm* — Erise IP, P.A.

(57) ABSTRACT

At a high level, embodiments of the invention relate to augmenting video data with presence data derived from one or more proximity tags. More specifically, embodiments of the invention generate forensically authenticated recordings linking video imagery to the presence of specific objects in or near the recording. One embodiment of the invention includes video recording system comprising a camera, a wireless proximity tag reader, a storage memory and control circuitry operable to receive image data from the camera receive a proximity tag identifier identifying a proximity tag from the proximity tag reader, and store an encoded frame containing the image data and the proximity tag identity in the storage memory.

20 Claims, 4 Drawing Sheets

Related U.S. Application Data continuation of application No. 14/517,368, filed on Oct. 17, 2014, now Pat. No. 9,159,371, which is a continuation of application No. 13/967,151, filed on Aug. 14, 2013, now Pat. No. 9,253,452.

(51) Int. Cl.
| | | |
|---|---|---|
| *H04N 5/77* | (2006.01) | |
| *H04N 7/18* | (2006.01) | |
| *H04W 12/106* | (2021.01) | |
| *H04W 12/47* | (2021.01) | |
| *H04N 5/765* | (2006.01) | |
| *G08B 13/196* | (2006.01) | |

(56) References Cited

U.S. PATENT DOCUMENTS

| | | | | |
|---|---|---|---|---|
| 2009/0252370 A1* | 10/2009 | Picard | H04N 19/467 | 382/100 |
| 2010/0177891 A1* | 7/2010 | Keidar | G06T 1/0021 | 375/E7.026 |
| 2010/0274816 A1* | 10/2010 | Guzik | H04N 21/2743 | 707/802 |
| 2013/0329063 A1* | 12/2013 | Zhou | H04N 5/23267 | 348/E5.078 |
| 2014/0040158 A1* | 2/2014 | Dalley, Jr. | G06Q 10/06 | 705/342 |
| 2014/0167954 A1* | 6/2014 | Johnson | G08B 27/001 | 340/539.11 |

* cited by examiner

FORENSIC VIDEO RECORDING WITH PRESENCE DETECTION

RELATED APPLICATIONS

This patent application is a continuation and claims priority benefit, with regard to all common subject matter, of commonly assigned U.S. patent application Ser. No. 14/880,453, filed Oct. 12, 2015, entitled "FORENSIC VIDEO RECORDING WITH PRESENCE DETECTION; which is a continuation of U.S. patent application Ser. No. 14/517,368, filed Oct. 17, 2014, entitled "FORENSIC VIDEO RECORDING WITH PRESENCE DETECTION," which is now U.S. Pat. No. 9,159,371, issued Oct. 13, 2015, ("the '371 Patent"). The '371 Patent is a continuation-in-part application and claims priority benefit, with regard to all common subject matter, of commonly assigned U.S. patent application Ser. No. 13/967,151, filed Aug. 14, 2013, and entitled "COMPUTER PROGRAM, METHOD, AND SYSTEM FOR MANAGING MULTIPLE DATA RECORDING DEVICES" ("the '151 Application"). The above-referenced patent and application are hereby incorporated by reference in their entirety into the present application.

Embodiments and/or features of the invention described in the present document may be used with the subject matter disclosed in commonly assigned U.S. Pat. No. 8,781,292, filed Sep. 27, 2013, issued Jul. 15, 2014, and entitled "COMPUTER PROGRAM, METHOD, AND SYSTEM FOR MANAGING MULTIPLE DATA RECORDING DEVICES" ("the '292 Patent"), which is a continuation application of the '151 Application. The '292 Patent is hereby incorporated by reference in its entirety into the present application.

Embodiments and/or features of the invention described in the present document may be used with the subject matter disclosed in commonly assigned U.S. patent application Ser. No. 14/040,329, filed Sep. 27, 2013, and entitled "PORTABLE VIDEO AND IMAGING SYSTEM" ("the '329 Application"); and commonly assigned U.S. patent application Ser. No. 14/040,006, filed Sep. 27, 2013, and entitled "MOBILE VIDEO AND IMAGING SYSTEM" ("the '006 Application"). The '329 Application and the '006 Application are hereby incorporated by reference in their entirety into the present application.

Further, embodiments and/or features of the invention described in the present document may be used with the subject matter disclosed in commonly assigned U.S. patent application Ser. No. 14/517,226, filed Oct. 17, 2014, and entitled "DUAL LENS CAMERA UNIT," and with commonly assigned U.S. patent application Ser. No. 14/517,160, filed Oct. 17, 2014, and entitled "BREATH ANALYZER, SYSTEM, AND COMPUTER PROGRAM FOR AUTHENTICATING, PRESERVING, AND PRESENTING BREATH ANALYSIS DATA." Each of these patent applications is also a continuation-in-part of the '151 Application. These patent applications are hereby incorporated by reference in their entirety into the present application.

BACKGROUND

1. Field

Embodiments of the invention generally relate to augmenting video data with presence data derived from one or more proximity tags. More specifically, embodiments of the invention generate forensically authenticated recordings linking video imagery to the presence of specific objects in or near the recording.

2. Related Art

Video recordings of law enforcement activities are becoming more common and more frequently used in legal proceedings. However, it is presently a weakness of such systems that the recordings they produce cannot be verifiably traced back to a specific recording device or authenticated as unaltered. Furthermore, specific objects appearing in the scene cannot be identified. This can be particularly significant when, for example, calibration or identification records for a device need to be produced.

SUMMARY

Embodiments of the invention address the above problems by augmenting video data with presence data derived from one or more proximity tags. A first embodiment of the invention includes a video recording system comprising a camera, a wireless proximity tag reader, a storage memory, and control circuitry operable to receive image data from the camera, receive a proximity tag identifier identifying a proximity tag from the proximity tag reader, and store an encoded frame containing the image data and the proximity tag identity in the storage memory.

In a second embodiment of the invention, a method of recording authenticated video with presence data comprises the steps of creating an augmented encoded frame by encoding video data into an encoded frame, receiving one or more proximity tag identifiers from a proximity tag reader, including the received proximity tag identifiers as metadata for the encoded frame to produce the augmented encoded frame, generating a digital signature for the augmented encoded frame, and storing the augmented encoded frame and digital signature.

In a third embodiment of the invention, a computer-readable medium storing an augmented video file is disclosed, the video file comprising a plurality of augmented frames, each augmented frame of the plurality of augmented frames including video data and one or more identifiers each associated with a proximity tag.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
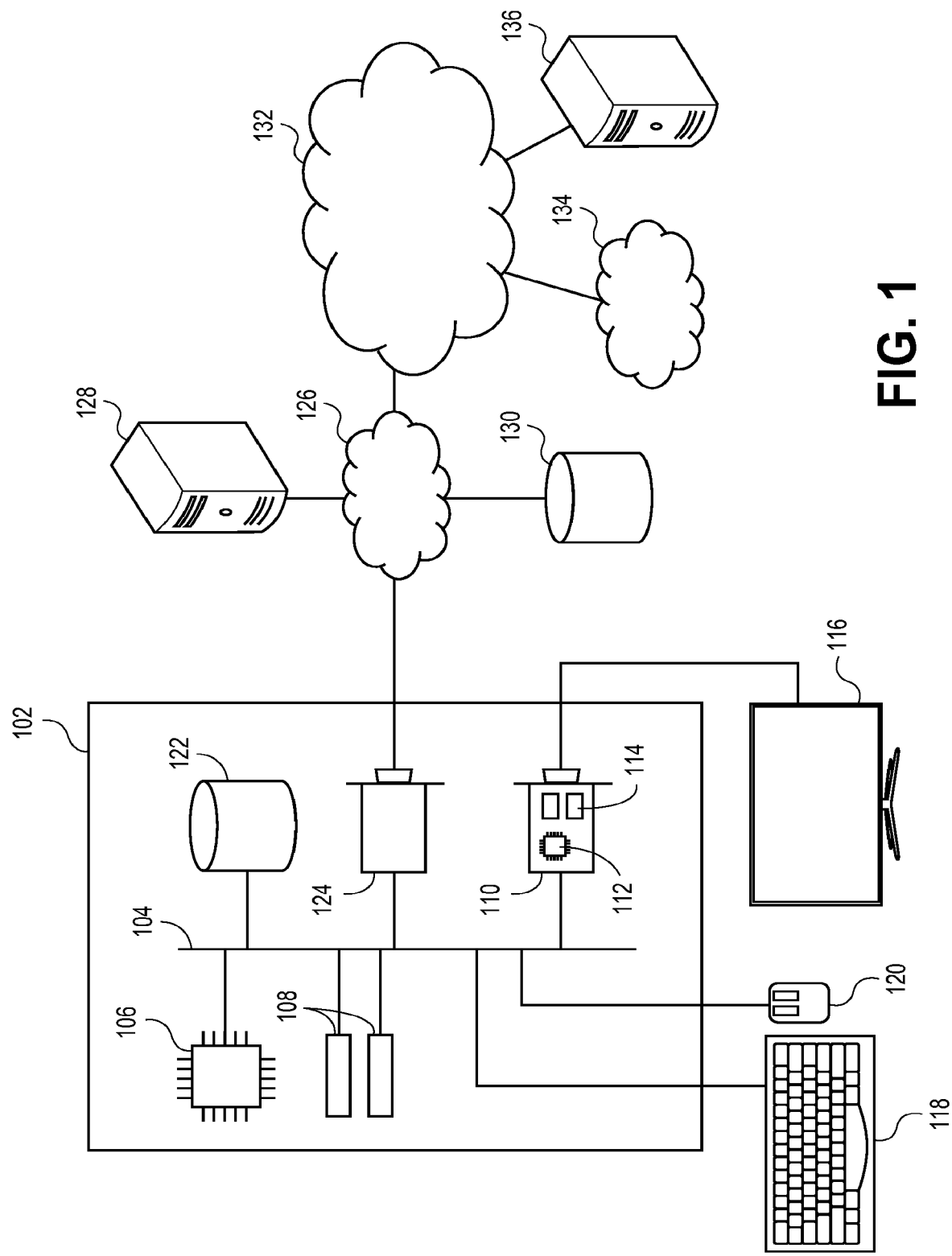
FIG. 1 depicts an exemplary hardware platform of certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Embodiments of the invention may be embodied as, among other things a method, system, or set of instructions embodied on one or more computer-readable media. Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Different forms of computer-readable media store data in different ways. For example, volatile storage media such as RAM may retain data only as long as it is powered, while non-volatile media such as flash memory retain data even when powered off. Furthermore, some forms of computer storage media are write-once, read many (WORM), such that data can be stored to them but not erased or overwritten. For some forms of WORM media, data can be recorded in multiple sessions, where the data from one session is appended to the data from the previous session. Other forms of media may be indefinitely rewriteable. Some forms of media may be encrypted, such that data is written to them encrypted by an encryption key (which can correspond to the device, the user, or be unique in some other way) and data read from them is scrambled unless decrypted with the corresponding decryption key.

Additionally, storage media can be made tamper-resistant such that it is difficult or impossible to alter or erase data stored to them, or to prevent reading data except by authorized means. WORM media or encrypted media, as described above are one way to make storage media tamper resistant. Another way is to make storage media physically difficult to remove, such as by covering them with epoxy after they have been installed. Other methods of making storage resistant tamper resistant are also known in the art and can be used.

A first broad class of embodiments of the invention includes a video recording system comprising a camera, a wireless proximity tag reader, a storage memory, and control circuitry operable to receive image data from the camera, receive a proximity tag identifier identifying a proximity tag from the proximity tag reader, and store an encoded frame containing the image data and the proximity tag identity in the storage memory.

Turning first to FIG. 1, an exemplary hardware platform that can serve as, for example, the control circuitry or other elements of certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules.

Also attached to system bus 104 is graphics card 110. In some embodiments, graphics card 104 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). In some embodiments, GPU 112 may be used for encoding, decoding, transcoding, or compositing video. Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Finally, network interface card (NIC) 124 is also attached to system bus 104 and allows computer 102 to communicate over a network such as network 126. NIC 124 can be any form of network interface known in the art, such as Ethernet, ATM, fiber, or Wi-Fi (i.e., the IEEE 802.11 family of standards). NIC 124 connects computer 102 to local network 126, which may also include one or more other computers, such as computer 128, and network storage, such as data store 130. Local network 126 is in turn connected to Internet 132, which connects many networks such as local network 126, remote network 134 or directly attached computers such as computer 136. In some embodiments, computer 102 can itself be directly connected to Internet 132.

Figure 2:
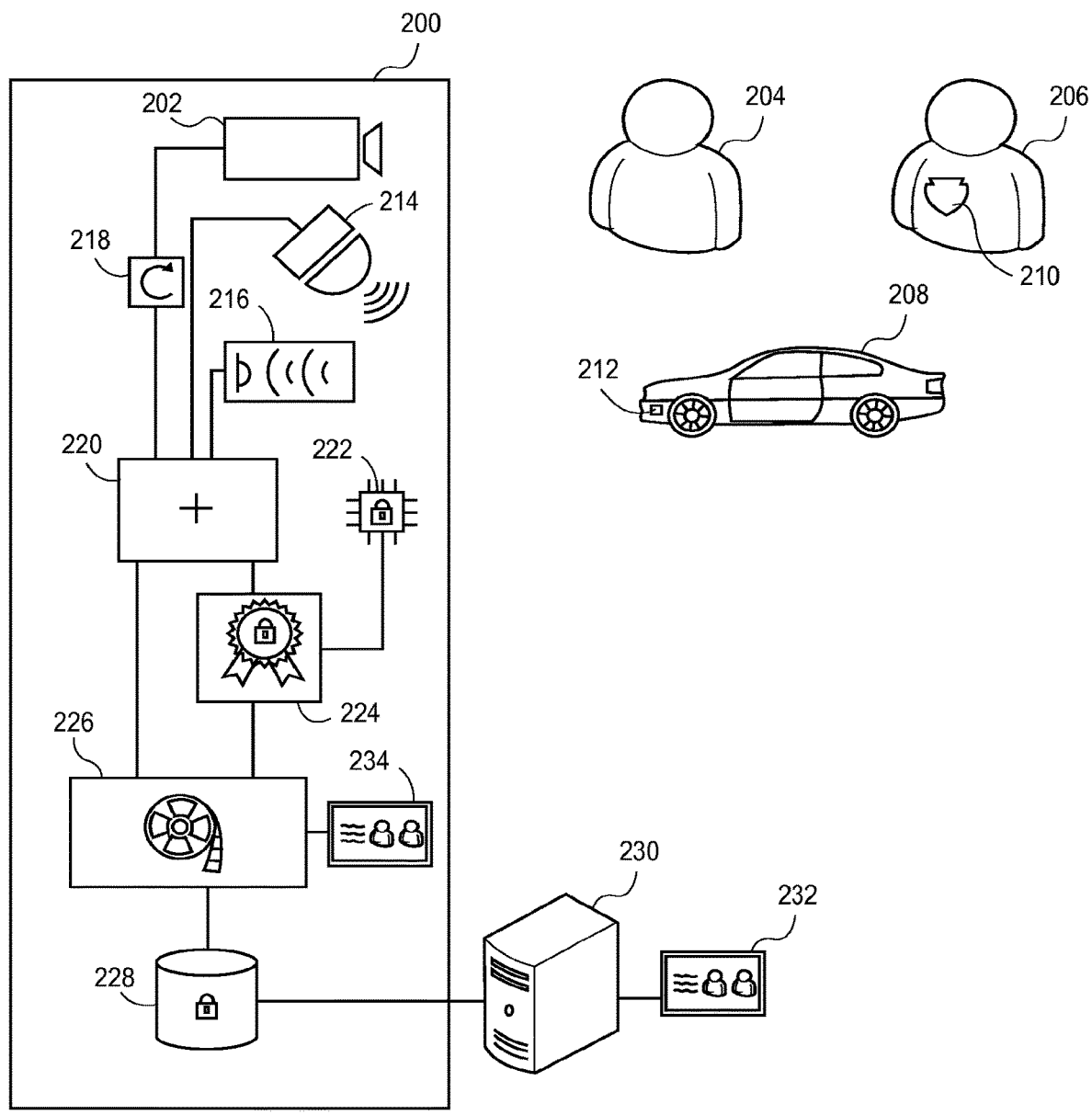
FIG. 2 depicts a system diagram illustrating the components of one embodiment of the invention.

Turning now to FIG. 2, a system diagram illustrating the components of one embodiment of the invention is depicted; the depicted system is generally referred to by reference numeral 200. In this embodiment, one component is camera 202, which captures imagery of a scene including one or more objects. In some embodiments, camera 202 is a still camera. In other embodiments, camera 202 is a video camera. In still other embodiments, a plurality of cameras may be simultaneously capturing imagery of the scene. Camera 202 may be a visible-spectrum camera, an infrared camera, a millimeter-wave camera, a low-light camera, or any other form of imaging device now known in the art or hereafter developed. Camera 202 may also include a microphone to capture audio along with video data.

In this example, the objects in the scene include a suspect 204, a police officer 206, and a patrol cruiser 208. Some objects in the scene may be tagged with proximity tags. Here, officer 206 is wearing a badge that includes proximity tag 210, and patrol cruiser 208 may have an integrated proximity tag 212. In another embodiment, a proximity tag associated with a user is embedded in a credit card-sized proximity card that can be carried in the user's wallet. Furthermore, objects not visible in the scene may also have proximity tags. For example, a second officer standing out of view may have a proximity tag, or officer 206 may have a service weapon that is not visible in the scene but has a proximity tag. Other objects in the scene, such as suspect 204, may not be tagged, or may start untagged and later become tagged. In this exemplary scenario, suspect 204 could become tagged by being restrained with handcuffs containing a proximity tag.

Any object that may need to be specifically identified if it appears in recorded image data can be tagged with a proximity tag. Examples of taggable objects in a law enforcement scenario include badges, service weapons, canine units, patrol cruisers, forensic kits, breath analyzers, radar and lidar guns, and evidence bags. It will be apparent to a person of skill in the art that the objects to be tagged will be different depending on the scenario.

A proximity tag such as proximity tag 210 and 212 is any device that radiates an identifying signal, herein referred to as the proximity tag identifier, that can be read by a corresponding reader such as proximity tag reader 214. Proximity tags can be active (meaning that they periodically broadcast their identifier), assisted passive (meaning that they broadcast their identifier only when interrogated by a signal from the reader), or passive (meaning that they have no power source and must be illuminated by a signal from the proximity tag reader in order to radiate their identifier). Other forms of proximity tags are also possible. Proximity tag identifiers may be preprogrammed into proximity tags, or may be field-programmable, such that the user assigns the identifier when the proximity tag is deployed. One common form of proximity tag system is the radio-frequency identification (RFID) tag and the corresponding RFID reader. Another form of proximity tag system utilizes a challenge-response protocol to avoid the spoofing of a proximity tag identifier. Any form of proximity tag, now known or hereafter developed, can be used.

Proximity tag reader 214 receives the proximity tag identifiers transmitted by proximity tags such as proximity tags 210 and 212. Depending on the type of proximity tag, a different type of reader may be required to receive the proximity tag identifiers. For example, an active reader is required to read passive tags. In some embodiments, proximity tag reader can determine the distance to the transmitting tag based on signal strength or other information. In some embodiments, multiple proximity tag readers are present. In some such implementations, positional information about the tag can be determined based on relative signal strength at each reader.

Also present in system 200 is one or more sensors 216. Sensors 216 collect or receive data to supplement the audiovisual data provided by camera 202. Examples of such sensors include additional microphones for recording supplementary audio data, additional clocks for providing time data, a radio receiver for recording radio transmissions, a global-positioning system (GPS) receiver for recording position data, a breath analyzer for detecting intoxication, a fingerprint reader for logging individual identity, and one or more accelerometers for recording movement and acceleration data. Additional sensors, such as a holster event sensor for detecting when a holster cover is opened or when a weapon is removed from the holster, may be directly or wirelessly connected.

In this embodiment, raw image data from camera 202 is first processed by encoder 218. Raw image data may be encoded by any still image or video codec now known in the art or developed in the future. In particular, many image and video file container formats provide for the addition of metadata to the image or video data. Where such provision is not made, metadata can be stored in an auxiliary file and optionally linked to specific video frames or still images using timestamp data, including a time when the image data was acquired, a filename for where the auxiliary data is stored, or similar.

Combiner 220 combines encoded video data from encoder 218 and proximity tag identity data received from proximity tag reader 220, resulting in an augmented encoded frame. In some embodiments, the identities of multiple proximity tags are added to a single augmented encoded frame. In some embodiments, data from sensors 216 is also added to the augmented encoded frame. In certain embodiments, not every frame is augmented. For example, when encoding MPEG data, identity tag data may only be included with I-frames. In other embodiments, identity tag data may be included in any frame where the set of detected tags changes. In some embodiments, data relating to the signal strength associated with each tag may also be included with the tag identity. In some embodiments with multiple proximity tag readers, the identity of the reader detecting the tag and/or the received signal strength at that reader is also included in the augmented encoded frame.

In some embodiments, augmented encoded frames are further digitally signed by the recording device to verify that they have not been tampered with. To do this, some embodiments use a device-specific key stored in memory 222. In some such embodiments, memory 222 is tamper resistant, such that it is difficult or impossible to extract the device-specific key. The digital signature can be generated by signer 224 using any algorithm for producing digital signatures now known in the art or later developed, including public-key schemes such as the Digital Signature Algorithm (DSA) and keyed hash schemes such as the Hash-based Message Authentication Code (HMAC).

In some embodiments, individual images or frames will be signed. In other embodiments, entire video files are signed. In still other embodiments, groups of frames are collectively signed. In yet other embodiments, only those frames that contain identity tag data are signed. In some embodiments, the digital signatures are stored as metadata with the encoded frame. In other embodiments, the digital signatures are stored as metadata with the container file. In still other embodiments, an auxiliary file containing a detached signature can be generated, potentially with time-stamps corresponding to the frames that are signed.

In this embodiment, augmented frames, together with non-augmented frames when they are present, are combined into a container file format by combiner 226 to produce a final video file. In cases where the image or video file format used makes no provision for embedded metadata, the multiple files containing image data, proximity tag identity data, sensor data and signature data may all be combined into a single file by combiner 226. In other embodiments, combiner 226 may be integrated into encoder 226. In still other embodiments, combiner 226 may re-encode, transcode, or compress data for efficient storage.

In some embodiments, a display such as display 234 may also be present in system 200 for viewing the final video data in real time. In some such embodiments, display 234 may be configured to overlay data such as sensor data and/or proximity tag identity data onto the video data. In other embodiments, display 234 takes the form of a heads-up display that overlays sensor data and/or proximity tag data on the scene as viewed by the user.

The video file produced (in this embodiment) by combiner 226 is stored in data store 228 for subsequent retrieval. In some embodiments, data store 228 takes the form of tamper-proof storage so that the video data, once stored, cannot be deleted or altered. In some embodiments, data store 228 is a remote data store to which data can be uploaded at the end of a shift or in real time. In some such embodiments, a computer such as computer 230 may be able to access the video file in real time for display on display 232 to a remote viewer such as a dispatcher.

In another broad class of embodiments of the invention, a method of recording authenticated video with presence data is disclosed, comprising the steps of creating an augmented encoded frame by encoding video data into an encoded frame, receiving one or more proximity tag identifiers from a proximity tag reader, including the received proximity tag identifiers as metadata for the encoded frame to produce the augmented encoded frame, generating a digital signature for the augmented encoded frame, and storing the augmented encoded frame and digital signature.

Figure 3:
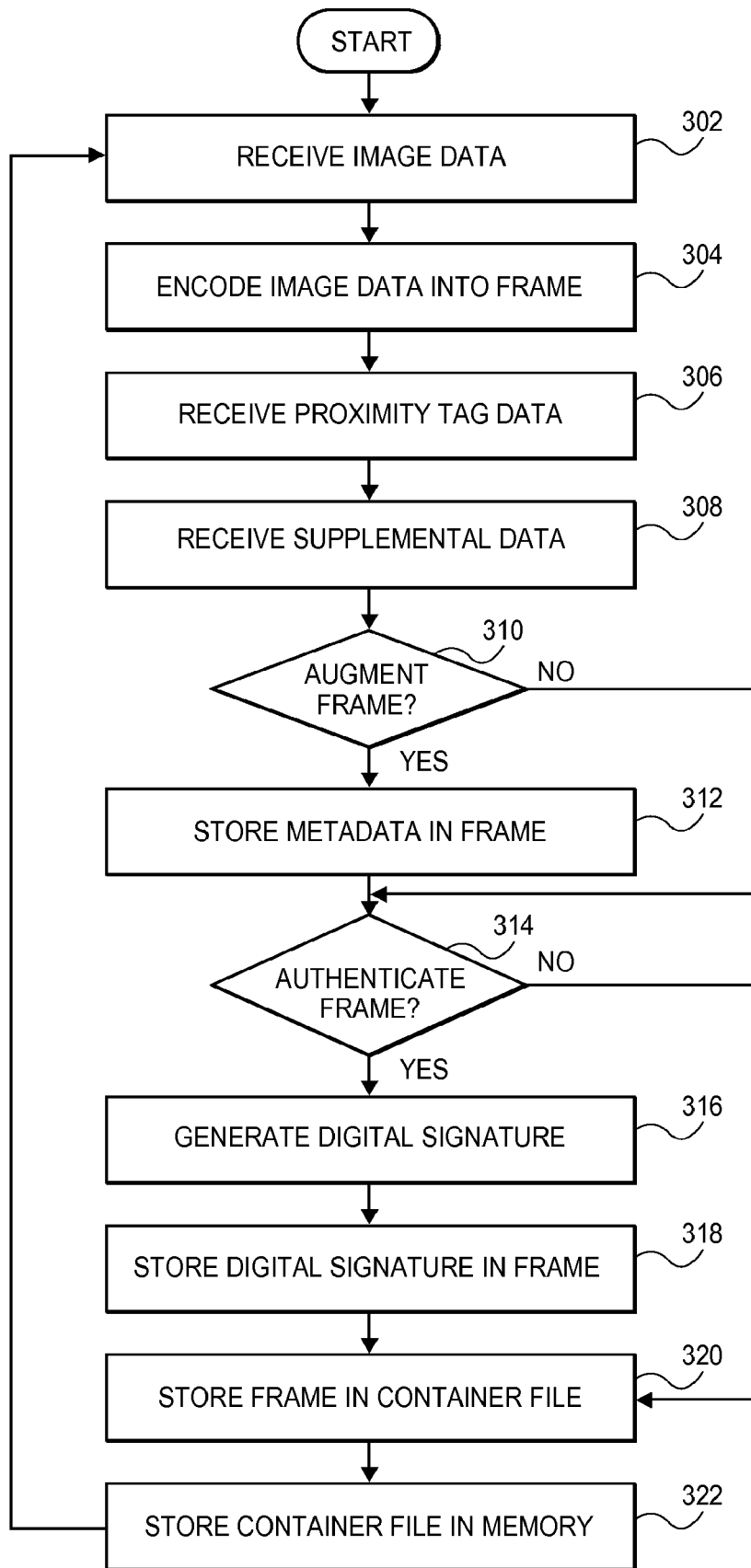
FIG. 3 depicts a flowchart illustrating the operation of one embodiment of the invention.

Turning now to FIG. 3, a flowchart illustrating the operation of one embodiment of the present invention is depicted. The method of creating augmented video may be initiated manually, or by a local or remote sensor-related triggering event. Such a sensor-related triggering event may be generated directly by the sensor, or by a recording device manager, such as a Digital Ally® VuLink®, that controls and synchronizes various recording devices. For example, the recording device manager may communicate (via wireless communication, wired communication, or both) to sensors such as described herein, one or more person-mounted camera units, a vehicle-mounted video camera oriented to observe events external to the vehicle, a vehicle-mounted video camera oriented to observe events internal to the vehicle, and/or one or more storage elements. In some embodiments, the recording device manager detects when one video camera begins recording, and then instructs all other associated devices to begin recording. The recording device manager may also send information indicative of a time stamp to the various recording devices for corroborating the recorded data.

For example, the recording device manager may instruct all associated video cameras to begin recording upon the receipt of a signal from a sensor such as a breath analyzer that a breath analysis has begun. This ensures that multiple video cameras record the breath analysis, for future authentication that the breath analysis was performed correctly. The recording device manager may also send a time stamp to all the associated video cameras to provide a corroboration of the various recorded data.

In another example scenario, an officer wearing a badge with an embedded proximity tag enters a patrol car. Detection of this proximity tag by the recording device manager serves as a triggering event and causes cameras in the patrol car and on the officer's body to begin recording. Proximity tag identifiers associated with both the officer and the patrol car are stored as metadata with both recordings. In this way, not only are the officer and the patrol car associated with each video recording, but the common proximity tag identifier data allows the two video recordings to be associated with each other as well.

The method begins at step 302, when image data is received. In some embodiments, the image data is a single frame of raw video data received from a video camera. In other embodiments, it is a pre-encoded frame or frames from a video camera. In still other embodiments, it is an image received from a still camera. In yet other embodiments, it is image data in any combination of the forms above from a plurality of cameras.

Processing then proceeds to step 304, where the image data received is encoded into a frame. Any image-coding algorithm now known in the art or hereafter developed can be employed for this encoding step. This process can also involve decoding, transcoding, or recoding the image data. Furthermore, if the image data was received in encoded form, no additional encoding may be necessary at this step. In embodiments where image data is received from multiple cameras, this step may also involve synchronizing, merging, and/or combining the image data from the multiple cameras. In some embodiments, image data from multiple cameras may be combined into a single augmented frame; in other embodiments, image data from multiple video cameras is stored in separate video data files. In still other embodiments, features of video codecs and container files allowing multiple camera angles of a single scene may be used to store separate frames containing video data from each of the cameras in the same video data file.

Next, at step 306, proximity tag identity data for one or more proximity tags is received from a proximity reader. In some embodiments, signal strength information or other information relating to the position of the tag relative to the reader is also received. In some embodiments, data is received from a plurality of tag readers. In such embodiments, different tag readers may read tag identity data for some or all of the same proximity tags, or a tag may be read by only one reader of the plurality of tag readers.

At this point processing proceeds to step 308, where supplemental data from a sensor such as sensor 216 is received. In some embodiments, data is received from more than one such sensor. Depending on the type of sensor, data may be received every frame, for a subset of frames, or for only a single frame. Different sensors may provide data at different rates and different times, so that successive frames may have different sets of supplemental data available.

Processing then proceeds to decision 310 where it is determined whether to augment the encoded frame. This determination may be made based on a variety of factors. In some embodiments, every frame is augmented. In other embodiments, only certain types of frame (such as I-frames in MPEG video encoding) are augmented. In still other embodiments, the frame will be augmented if a triggering signal is generated based on data contained in the frame, the proximity tag identity data, and/or the sensor data. For example, the detection of particular tags, or particular numbers or combinations of tags, may always trigger frame augmentation. In general, a triggering event can be any event suggesting that additional context about the frame should be stored.

For example, the user triggering the siren and/or light bar of a patrol cruiser might be a triggering event. Alternately, a velocity or acceleration reading, either from the cruiser or from integrated velocity and/or acceleration sensors may be a triggering event. Similarly, a vehicle crash, detected by an accelerometer reading, airbag deployment, or similar stimulus, might be a trigger event. Additionally, a positional reading could be a triggering event. Such a positional reading could be absolute (for example, entering or exiting a particular geofenced area) or relative (for example, moving more than a particular distance from a patrol cruiser or other fixed or mobile point of reference). A further example of a triggering event is an indication from a sensor configured to detect when a holster cover is opened or when a weapon is removed from the holster. Another form of user-related triggering event could come in the form of one or more biometric stress indications (such as elevated heart rate, blood pressure respiration, etc.) obtained from biometric sensors worn by the user. Similarly, audio data could generate triggering events if raised voices or high levels of vocal stress are detected.

Triggering events can also come from the context of the data being collected. For example, when encoder 218 detects that the video data it is processing contains a face, a triggering event could be generated. Alternately, this functionality could be limited to the recognition of a particular face (for example, if the user sees a face matching a photograph provided with a warrant, or on a wanted poster, a trigger event could be generated). Similar recognition algorithms can be applied to other data streams as well; for example, the audio signature of a gunshot could be a triggering event, or the positional signature of evasive maneuvering.

Additionally, triggering signal can be generated manually by the user or, in embodiments where data is streamed to a remote date store, by a remote observer. Of course, a person of skill in the art will recognize that a wide variety of triggering signals are possible and that variations and combinations of the above will become apparent.

If the determination is made to augment the frame, processing proceeds to step 312; otherwise, processing continues at decision 314. At step 312, some or all of the proximity tag data and supplementary sensor data is stored as metadata for the encoded frame, creating an augmented encoded frame. As discussed above, some video codecs have provision for encoding frame-level metadata. In such embodiments, sensor data and proximity information can be stored directly with the encoded frame. In other cases, it may be desirable to store the proximity tag data and supplementary sensor data as metadata for the video file as a whole. In this case, it may be advantageous to store a timestamp or other frame identifier with the data to associate different sets of supplemental data with their respective encoded frames. In other embodiments, it may be advantageous to leave the video file unaltered and store the proximity tag data and supplementary sensor data in a separate metadata file. Again, storing timestamps or frame identifiers associated with the data may be useful.

Processing now proceeds to decision 314. At this point, a determination of whether to authenticate the (augmented or non-augmented) frame is made. This decision can be based on the same factors as the determination of whether to augment a frame; however, if the computational cost of calculating a digital signature is high, it may not be feasible to calculate a digital authentication for every frame. In some embodiments, only some of the frames are digitally signed. In other embodiments, sets of frames are digitally signed as a group. In still other embodiments, an entire video file is signed as a single unit. If the determination is made to generate a digital signature, processing proceeds to step 316.

At step 316, the digital signature is generated. As discussed above, any digital signature or authentication code algorithm can be used to produce these digital signatures. Next, at step 318, the digital signature is stored. As with the metadata discussed above, digital signatures can be stored with the corresponding frame, with the corresponding video file, or in a separate file. In some embodiments, the digital signature is only calculated for the encoded frame; in other embodiments, the digital signature is calculated for the encoded frame together with any metadata relating to it.

After the digital signature is stored, or if the determination was made at decision 314 not to generate a digital signature, the frame is stored in the container video file at step 320. Any container file format can be used. For example, if the encoded frames are encoded using the MPEG4 Part 10 codec, which is commonly referred to as H.264 codec, a variety of container files including 3GP, DivX, MP4, and MPEG Program Stream can be used. Different video codecs can also use these container file formats or a variety of others. If the original image data was still image data, or if auxiliary files are used for storing metadata or detached digital signatures, an archive file format such as ZIP may be used. In some embodiments, nested container file formats can be used, such as a ZIP file containing an MP4 file containing video, an XML file containing proximity tag and sensor data, and a PGP signature file containing a detached signature.

Finally, at step 322, the container file is written to memory (such as data store 228). In some embodiments, the container file is not written out until video recording completes. In other embodiments, the video file is progressively written out as additional frames are generated. In still other embodiments, intermediate container files are generated and stored, and a final "closed" container is written out once recording terminates. Once the container file is written out, processing returns to step 302, where additional image data can be processed.

In another broad class of embodiments of the invention, a computer-readable medium storing an augmented video file is disclosed, the video file comprising a plurality of augmented frames, each augmented frame of the plurality of augmented frames including video data and one or more identifiers each associated with a proximity tag.

Figure 4A:
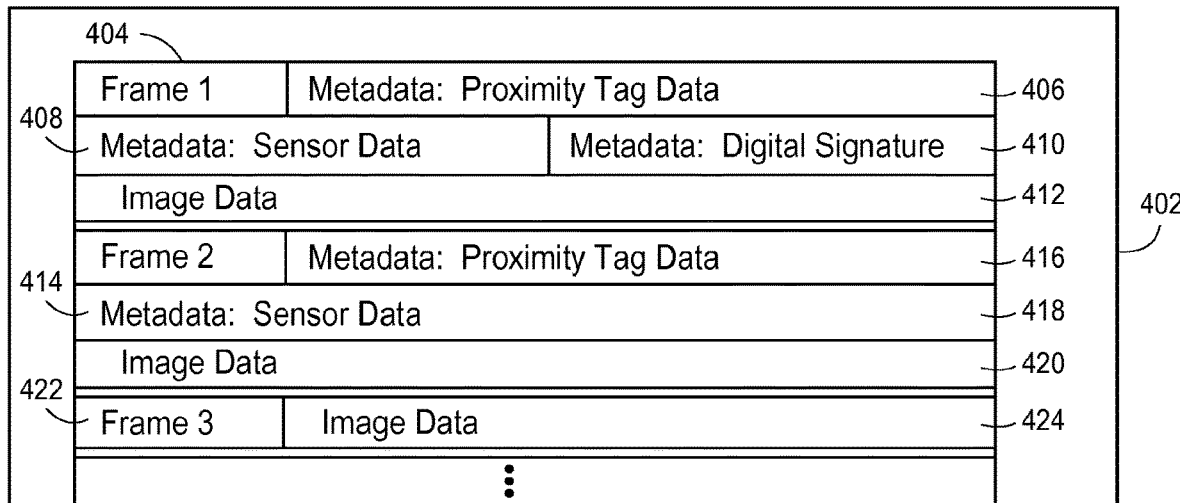
FIGS. 4A and 4B depict illustrative video files produced in accordance with one embodiment of the present invention.
Figure 4B:
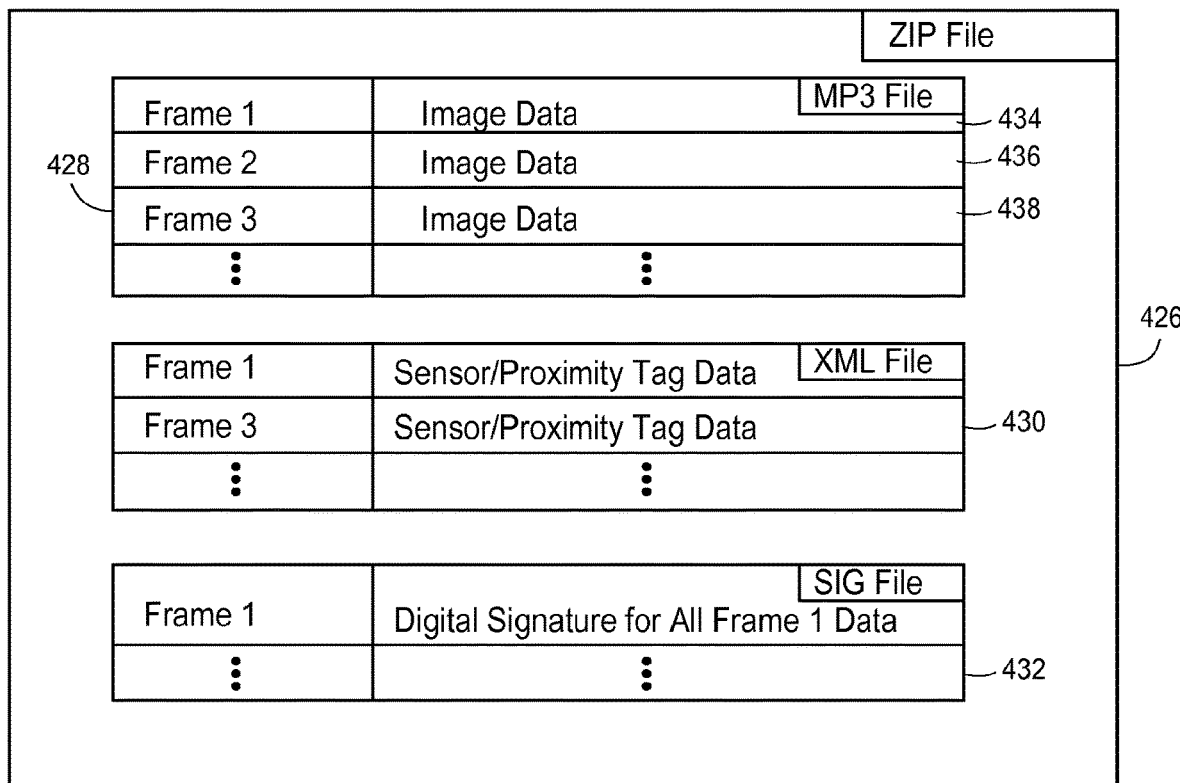

Turning now to FIGS. 4A and 4B, two embodiments of an augmented video file are depicted. In FIG. 4A, an augmented video file 402 that stores proximity tag data, sensor data, and digital signature data as metadata for the associated frame is depicted. Frame 404 is an augmented frame, including metadata fields for proximity tag data 406, sensor data 408, and digital signature 410, which authenticates proximity tag data 406, sensor data 408, and image 412. Also included in frame 404 is the actual image data 412.

Also present in file 402 is frame 414, which is an augmented but non-authenticated frame. Accordingly, there are metadata fields including proximity tag data 416 and sensor data 418 in addition to image data 420. The last depicted frame in file 402 is frame 422, which is a non-augmented, non-authenticated frame. Accordingly, only image data 424 is present (in addition to whatever metadata fields are ordinarily generated in the process of encoding).

FIG. 4B, by contrast, depicts an augmented video file 426 where all metadata is stored in auxiliary files. This may be desirable where, for example, original, unaltered video files are needed for evidentiary purposes. In this embodiment, augmented video file 426 is a ZIP file containing video data file 428, which is in MP4 format, proximity tag and sensor data file 430, which is in XML format, and digital signature file 432, containing ASCII-encoded PGP signatures. A person of skill in the art will immediately recognize that other arrangements and file formats are possible; for example, proximity tag data and sensor data could be in separate files.

Video data file 428 contains image data frames 434, 436, and 438. In some embodiments, these could be identical to image data received from the camera. In other embodiments, these could be re-encoded or transcoded. In this embodiment, proximity tag and sensor data file 430 contains proximity tag and sensor data in XML format. Present with each set of proximity tag and sensor data is a frame identifier associating an image data frame such as image data frame 434 or 438 with the corresponding proximity tag and sensor data.

Finally, video data file 428 contains digital signature file 432 containing detached signatures for one or more video frames and/or the corresponding proximity tag and sensor data. Again, a frame identifier can be included with each digital signature to associate it with the corresponding image data frame.

Video data file 428, alone or in combination with other augmented or non-augmented video files can then be used to document a scene of interest. In some cases, post-processing of one or more video data files will be employed to better reconstruct such a scene. In a law enforcement scenario, for example, at the end of a shift, a large volume of video data may be collected from officers returning to the station house. If an incident of interest occurred during that shift, then it may be desirable to immediately collect all relevant recordings. In some cases, this can be done by searching the metadata embedded in each video for one or more proximity tags relevant to the incident (such as, for example, a proximity tag associated with an officer, vehicle, or object known to have been present at the scene). In this way, all of the augmented video data pertaining to the incident can easily be collected without error or significant labor.

Similarly, augmented video data can easily be searched for any video data matching certain criteria. For example, video data recorded in a certain area can easily be located by searching any location data (such as GPS metadata) stored in or with the video data for corresponding coordinates. Recordings of DUI stops can easily be obtained by searching for video data where a proximity tag associated with a breath analyzer is present. All video recordings of an officer can be quickly collected by searching video data for a proximity tag associated with that officer's badge. Many other applications will quickly become apparent to a person of skill in the art.

Although embodiments of the invention have been discussed in a law enforcement context, a person of skill in the art will realize that numerous other applications immediately present themselves, including inventory and stock control, gaming, and surveillance. Accordingly, the invention is not limited to the context discussed, but can be applied in a wide variety of scenarios.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-readable media storing computer-executable instructions that, when executed by a processor, perform a method of associating image data for an event with a presence of a law enforcement officer, the method comprising:
   detecting a triggering event by one or more sensors;
   receiving the image data from an image data recording device associated with the law enforcement officer;
   receiving radio-frequency proximity tag data from a proximity tag reader associated with the law enforcement officer;
   determining to augment the image data based on the triggering event;
   augmenting a frame of the image data to include a first portion of the radio-frequency proximity tag data corresponding to a time of the frame; and
   augmenting an additional frame of the image data to include a second portion of the radio-frequency proximity tag data corresponding to a time of the additional frame,
   wherein the second portion of the radio-frequency proximity tag data is distinct from the first portion of the radio-frequency proximity tag data.

2. The media of claim 1, wherein the computer-executable instructions are further executed to perform triggering augmentation of one or more frames by a recording device manager.

3. The media of claim 1, wherein the computer-executable instructions are further executed to perform storing a digital signature for authenticating the image data as metadata, and generating an augmented encoded frame comprising the metadata.

4. The media of claim 1, wherein the triggering event is associated with one of a first sensor associated with the law enforcement officer or a second sensor associated with a vehicle of the law enforcement officer.

5. The media of claim 1, wherein the computer-executable instructions are further executed to perform determining a set of one or more frames to augment based least in part on a computational cost to augment the set of one or more frames.

6. The media of claim 1, wherein the computer-executable instructions are further executed to perform determining to add a digital signature to a plurality of augmented frames, wherein a number of augmented frames to which to add the digital signature is based at least in part on a computation cost.

7. The media of claim 1,
wherein the one or more sensors is the image data recording device, and
wherein the triggering event is based at least in part on data contained in one or more frames.

8. The media of claim 1, wherein the computer-executable instructions are further executed to perform:
generating a container file operable to store one or more augmented frames; and
storing metadata with the one or more augmented frames in the container file,
wherein the metadata comprises a timestamp for synchronizing data from at least one other sensor.

9. A method of associating image data for an event with a presence of a law enforcement officer, the method comprising:
detecting a triggering event by one or more sensors associated with the law enforcement officer;
receiving the image data from an image data recording device associated with the law enforcement officer;
receiving radio-frequency proximity tag data from a radio-frequency proximity tag reader associated with the law enforcement officer;
determining to augment the image data based on the triggering event;
augmenting a frame of the image data to include a first portion of the radio-frequency proximity tag data corresponding to a time of the frame and data associated with the one or more sensors corresponding to the time of the frame; and
augmenting an additional frame of the image data to include a second portion of the radio-frequency proximity tag data corresponding to a time of the additional frame,
wherein the second portion of the radio-frequency proximity tag data is distinct from the first portion of the radio-frequency proximity tag data.

10. The method of claim 9, further comprising displaying the image data by a head-up display worn by the law enforcement officer.

11. The method of claim 9,
wherein the one or more sensors comprises the image data recording device, and
wherein the triggering event is based on the image data contained in one or more frames.

12. The method of claim 9, further comprising triggering augmentation of one or more frames by a recording device manager.

13. The method of claim 9, wherein the determination to augment one or more frames is further based at least in part on the one or more sensors detecting an action of the law enforcement officer.

14. The method of claim 13, wherein the action by the law enforcement officer is one of unholstering a firearm, exiting a vehicle, activating a light bar of the vehicle, or accelerating the vehicle beyond a threshold.

15. A system of associating image data for an event with a presence of a law enforcement officer, the system comprising:
one or more sensors detecting a triggering event;
an image data recording device receiving the image data;
a radio-frequency proximity tag reader associated with the law enforcement officer and receiving radio-frequency proximity tag data,
one or more non-transitory computer-readable media storing a computer-executable instructions that, when executed by a processor, perform a method of associating the image data for the event with the presence of the law enforcement officer, the method comprising:
determining to augment the image data based on the triggering event;
augmenting a frame of the image data to include a first portion of the radio-frequency proximity tag data corresponding to a time of the frame; and
augmenting an additional frame of the image data to include a second portion of the radio-frequency proximity tag data corresponding to a time of the additional frame,
wherein the second portion of the radio-frequency proximity tag data is distinct from the first portion of the radio-frequency proximity tag data.

16. The system of claim 15, wherein the determination to augment one or more frames is further based at least in part on the one or more sensors detecting an action of the law enforcement officer.

17. The system of claim 15, wherein the triggering event is one of unholstering a firearm, exiting a vehicle, activating a light bar of the vehicle, and accelerating the vehicle beyond a threshold.

18. The system of claim 15, wherein the computer-executable instructions are further executed to perform storing a digital signature for authenticating the image data as metadata, and generating an augmented encoded frame with the metadata.

19. The system of claim 15, further comprising:
generating a container file operable to store one or more augmented frames; and
storing metadata with the one or more augmented frames in the container file,
wherein the metadata is indicative of the triggering event.

20. The system of claim 15,
wherein the one or more sensors is the image data recording device, and
wherein the triggering event is based on the image data contained in one or more frames.

* * * * *